United States Patent
Chen et al.

(10) Patent No.: US 9,738,155 B2
(45) Date of Patent: Aug. 22, 2017

(54) SHIFTER-SUPPORTING BASE AND SHIFTER ASSEMBLY AND VEHICLE EMPLOYING THE SAME

(71) Applicant: FORD GLOBAL TECHNOLOGIES, LLC, Dearborn, MI (US)

(72) Inventors: Leo Chen, Nanjing (CN); Gary D. Mullen, Plymouth, MI (US); Iain Raymond Jones, Northville, MI (US); Denis Gerald O'Shannessy, Melbourne (AU); Paul Schmidt, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 14/877,982

(22) Filed: Oct. 8, 2015

(65) Prior Publication Data

US 2016/0101692 A1    Apr. 14, 2016

(30) Foreign Application Priority Data

Oct. 14, 2014    (CN) .......................... 2014 1 0543147

(51) Int. Cl.

| | |
|---|---|
| *B60K 20/02* | (2006.01) |
| *B60R 7/04* | (2006.01) |
| *B60N 2/46* | (2006.01) |
| *B60N 3/10* | (2006.01) |
| *B60H 1/24* | (2006.01) |

(Continued)

(52) U.S. Cl.
CPC .............. *B60K 20/02* (2013.01); *B60H 1/24* (2013.01); *B60N 2/46* (2013.01); *B60N 2/466* (2013.01); *B60N 3/101* (2013.01); *B60K 20/04* (2013.01); *F16H 59/02* (2013.01)

(58) Field of Classification Search
CPC ....... B60R 7/04; B60R 13/0262; B60K 20/02; B60K 20/04; B60H 1/24; B60N 2/46; B60N 3/101; B60N 2/466; F16H 59/02
USPC ...................................... 296/24.34
See application file for complete search history.

(56) References Cited

U.S. PATENT DOCUMENTS

| | | | |
|---|---|---|---|
| 4,512,239 A | 4/1985 | Watanabe et al. | |
| 5,887,485 A * | 3/1999 | VanOrder | B60K 20/04 29/469 |
| 6,338,514 B1 | 1/2002 | Arold et al. | |

(Continued)

FOREIGN PATENT DOCUMENTS

| | | |
|---|---|---|
| EP | 1527913 | 5/2005 |
| JP | 7032859 | 2/1995 |

(Continued)

*Primary Examiner* — Glenn Dayoan
*Assistant Examiner* — Melissa A Black
(74) *Attorney, Agent, or Firm* — Alice Xu; Mohr Intellectual Property Law Solutions, PC (57) ABSTRACT

The present invention in one or more embodiments provides a base for supporting shifter, wherein the base includes longitudinal axis, a first cross-section including a first border defining therein a first aperture, and a second cross-section positioned spaced apart from the first cross-section along the longitudinal axis and including a second border defining therein a second aperture. The base as provided is believed to be advantageous in supporting the shifter while allowing arrangement for the air duct to pass through and therefore to improve comfort for the rear-seat passenger without having to necessarily increase the interior packaging size.

19 Claims, 6 Drawing Sheets

(51) Int. Cl.
*B60K 20/04* (2006.01)
*F16H 59/02* (2006.01)

(56) References Cited

U.S. PATENT DOCUMENTS

| | | |
|---|---|---|
| 2006/0240760 A1 | 10/2006 | Bubenhofer et al. |
| 2009/0058120 A1 | 3/2009 | Ioka et al. |
| 2009/0179457 A1 | 7/2009 | Platto et al. |
| 2013/0248572 A1 | 9/2013 | Myers |

FOREIGN PATENT DOCUMENTS

| | | |
|---|---|---|
| JP | 11034639 | 2/1999 |
| JP | 2008302793 | 12/2008 |

\* cited by examiner

SHIFTER-SUPPORTING BASE AND SHIFTER ASSEMBLY AND VEHICLE EMPLOYING THE SAME

RELATED APPLICATION(S)

This application claims the benefit of Chinese New Invention Patent Application No.: CN201410543147.5, filed on Oct. 14, 2014, the entire contents thereof being incorporated herein by reference.

TECHNICAL FIELD

The present invention relates to a base for supporting a shifter, a shifter assembly and a vehicle using the same.

BACKGROUND

With advances in automotive technologies and increases in consumers' attention to comfort, more and more vehicles are equipped with rear air outlets to provide conditioned air flow for rear-seated passengers. Often, the air duct from an air conditioner may be disposed within the central console. However, it may be difficult in certain vehicles to position the air duct to extend rearward and through the shifter due to the limited packaging space of the central console along a longitudinal Y axis.

One solution may be to provide the air duct to extend along one side or two sides of the base within the central console. This configuration is met with limitation in that the air duct may need to be sized small enough to fit into the very limited space at the sides of the central console.

SUMMARY

In one or more embodiments the present invention provides a base for supporting a shifter, where the base includes a longitudinal axis, a first cross-section including a first border defining therein a first aperture, and a second cross-section positioned spaced apart from the first cross-section along the longitudinal axis and including a second border defining therein a second aperture.

In another or more embodiments, the present invention provides a shifter assembly, wherein the shifter assembly includes a shifter body, and a base supporting the shifter body and having a longitudinal axis, a first cross-section of the base including a first border defining therein a first aperture, a second cross-section of the base positioned spaced apart from the first cross-section along the longitudinal axis and including a second border defining therein a second aperture.

In yet another or more embodiments, the present invention provides a vehicle including a longitudinal axis, a central console having an armrest and an air outlet positioned below the armrest, and a shifter assembly positioned anterior to the air outlet of the central console, where the shifter assembly includes a shifter body and a base supporting the shifter body, and where the base includes a first cross-section including a first border defining therein a first aperture, and a second cross-section positioned spaced apart from the first cross-section along the longitudinal axis and including a second border defining therein a second aperture.

One or more advantageous features as described herein are believed to be readily apparent from the following detailed description of one or more embodiments when taken in connection with the accompanying drawings.

BRIEF DESCRIPTION OF THE DRAWINGS

Reference is now made to the one or more embodiments illustrated in greater detail in the accompanying drawings and described below wherein.

DETAILED DESCRIPTION OF ONE OR MORE EMBODIMENTS

As referenced in the FIGS., the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

The present invention in one or more embodiments is advantageous in providing a base for supporting a shifter which may effectively utilize the limited space near the central console, especially the space within the base by integrating air duct into the base without changing the original structure of the central console. By this design, the cross-sectional area of the air duct may not need to be substantially changed, while increasing the air flow characteristics and comfort performance.

Figure 1:
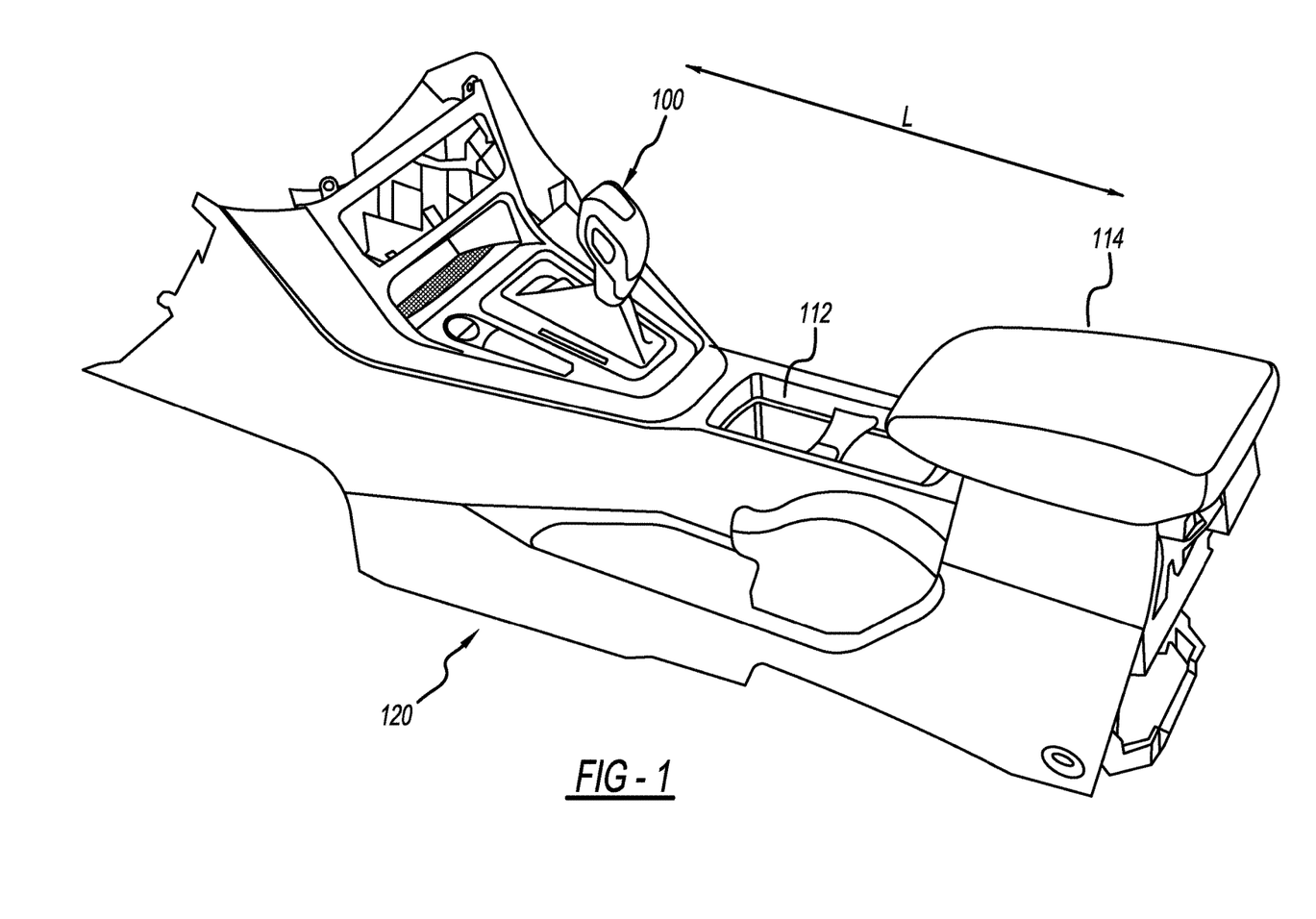
FIG. 1 illustratively depicts a partial perspective view of a shifter assembly employable in a vehicle according to one or more embodiments of the present invention.

FIG. 1 illustratively depicts a partial perspective view of a shifter assembly generally shown at 100 as positioned relative to an armrest 114 and a cup holder 112 in a vehicle (not shown). In particular, the shifter assembly 100 is depicted in FIG. 1 to be positioned anterior to the cup holder 112 or the armrest 114 along a longitudinal axis "L" of the vehicle in which the shifter assembly 100 may be present. However, the shifter assembly 100 does not have to limit its position relative to the cup holder 112 or the armrest 114 as depicted in FIG. 1; in fact and for instance, the shifter assembly 100 may be positioned posterior to a cup holder such as the cup holder 112.

Figure 2:
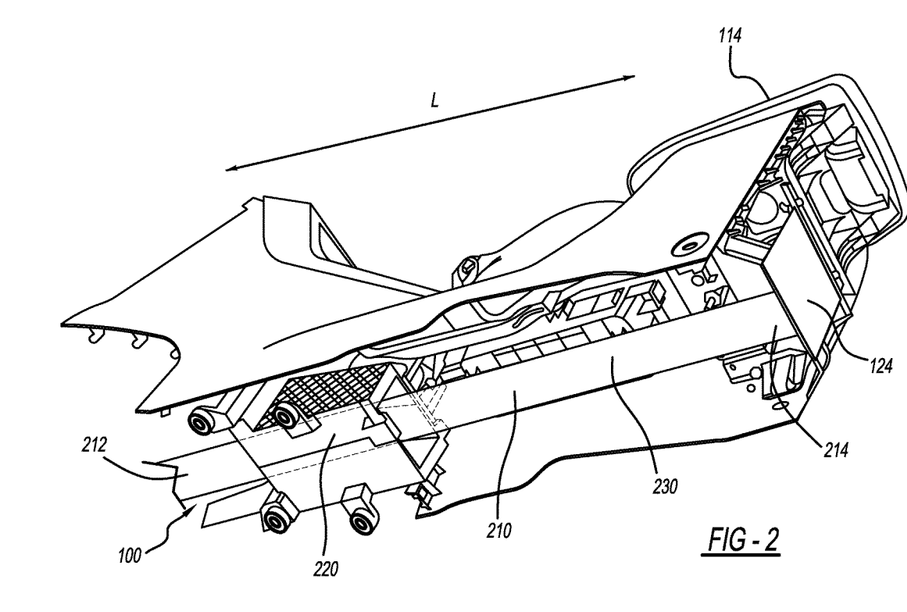
FIG. 2 illustratively depicts another perspective view of the shifter assembly referenced in FIG. 1.

Moreover, the shifter assembly 100 is shown in FIG. 1 and FIG. 2 to be on a central axis (not shown) of the central console 120; however, the shifter assembly 100 in one or more embodiments may be positioned relatively away from the central axis of the central console 120 and relatively closer to a driver or a passenger. Furthermore, the central console 120 and the cup holder 112 may be of any suitable form, shape, configuration or material. The term "anterior"

refers to a front portion of the vehicle in one or more embodiments of the present invention.

FIG. 2 illustratively depicts a bottom view of the central console 120 along with the shifter assembly 100, the cup holder 112 and the central console armrest 114. As is detailed herein elsewhere, the shifter assembly 100 is advantageously configured to receive there-through an air duct or air pipe 210 for transporting a conditioned air flow. The air duct 210 is configured to have its one end 212 connected to an air conditioner (not shown) and another end 214 extending rearward through the shifter assembly 100 to a rear-seat passenger (not shown). Under certain instances, the another end 214 of the air duct 210 may extend rearward to a rear air outlet 124 positioned on a posterior end of the central console 120 and close to the armrest 114 to effectively provide the conditioned air flow to the rear-seat passenger.

Figure 3:
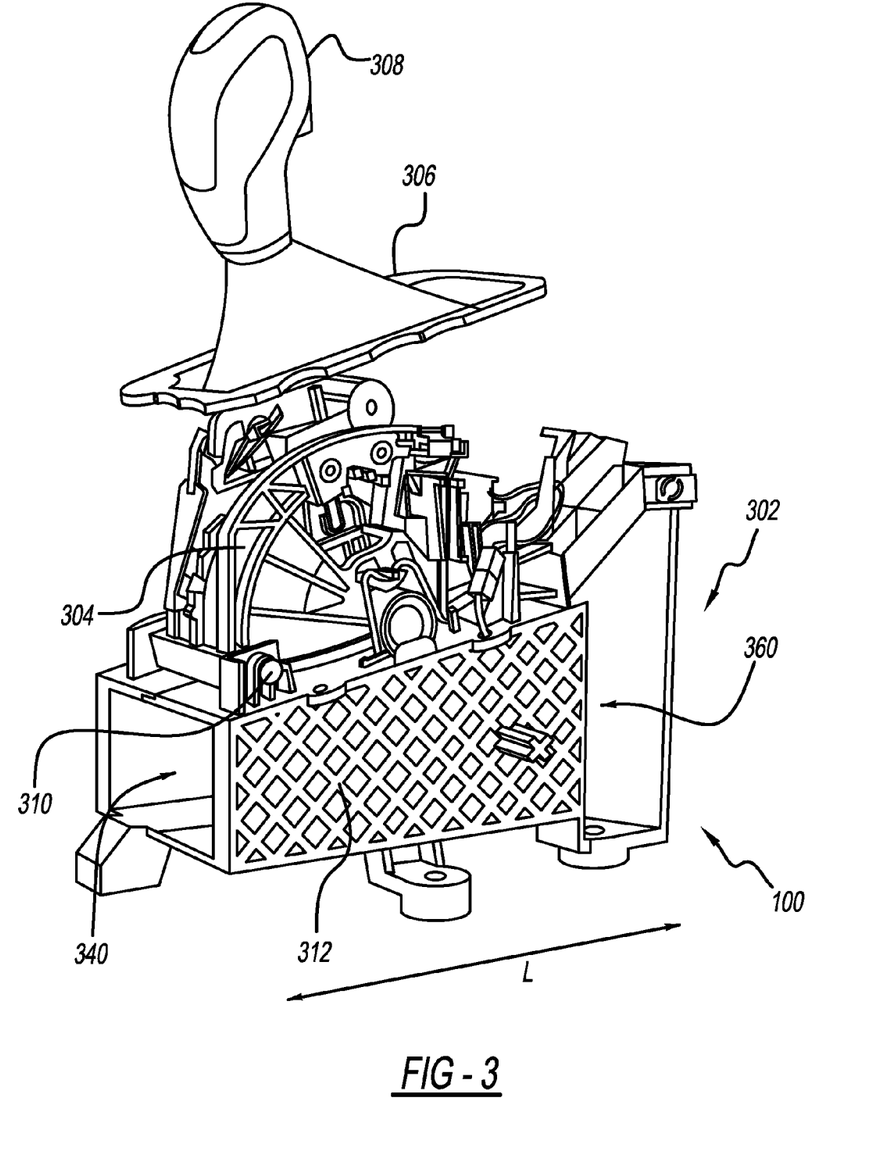
FIG. 3 illustratively depicts an enlarged perspective view of a portion of the shift assembly referenced in FIG. 1 or FIG. 2.

Referring back to FIG. 2 and further in view of FIG. 3, the air duct 210 includes a first portion 220 received through a base 302 of the shifter assembly 100 and a second portion 230 positioned posterior to the first portion 220 along the longitudinal axis "L". In certain embodiments, and as illustratively depicted in FIG. 2, the second portion 230 of the air duct 210 may be positioned separately below the cup holder 112 and the armrest 114, and extend in a rearward direction along the longitudinal axis "L" toward the rear-seat passenger. In certain embodiments, however, the second portion 230 of the air duct 210 may be partially received through and within a bottom section of the cup holder 112 and/or a storage space of the armrest 114.

With continuing reference to FIG. 3, the shifter assembly 100 includes a shifter 306 and the base 302 supporting the shifter 306. The shifter 306 includes a shifter body 304 and a shifter lever 308 attached to the shifter body 304. The shifter 306 is attached to the base 302 by a locking pole 310. The base 302 defines a number of reinforcing ribs 312.

Figure 4A:
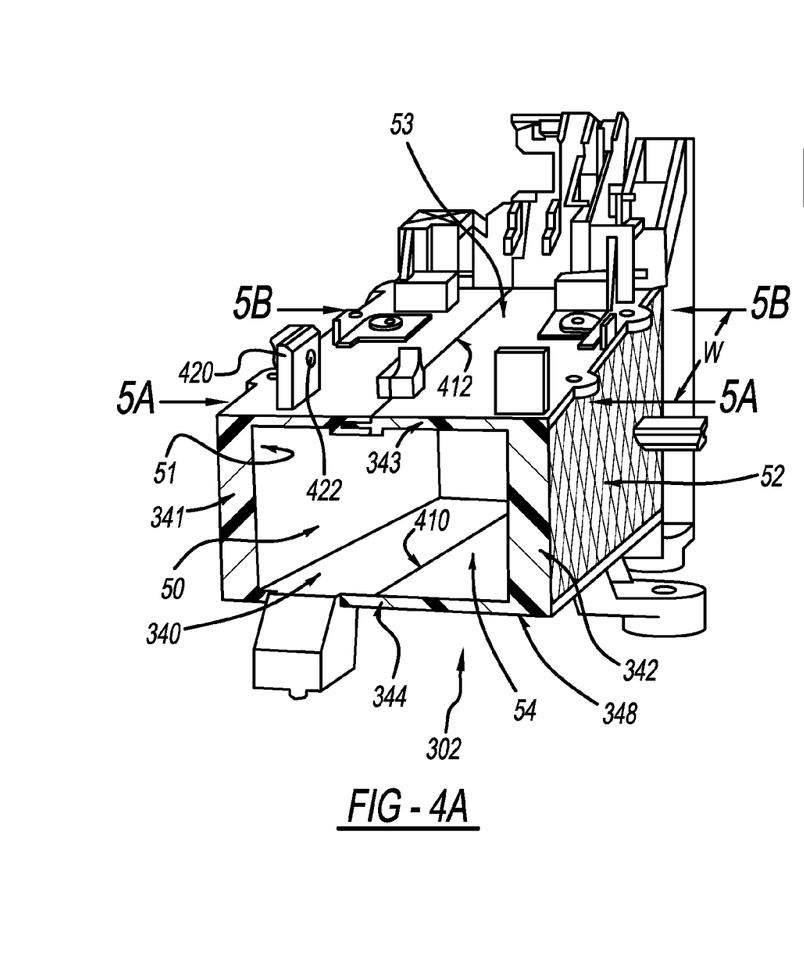
FIG. 4A illustratively depicts a rear view of a base of the shifter assembly referenced in FIG. 3.
Figure 4B:
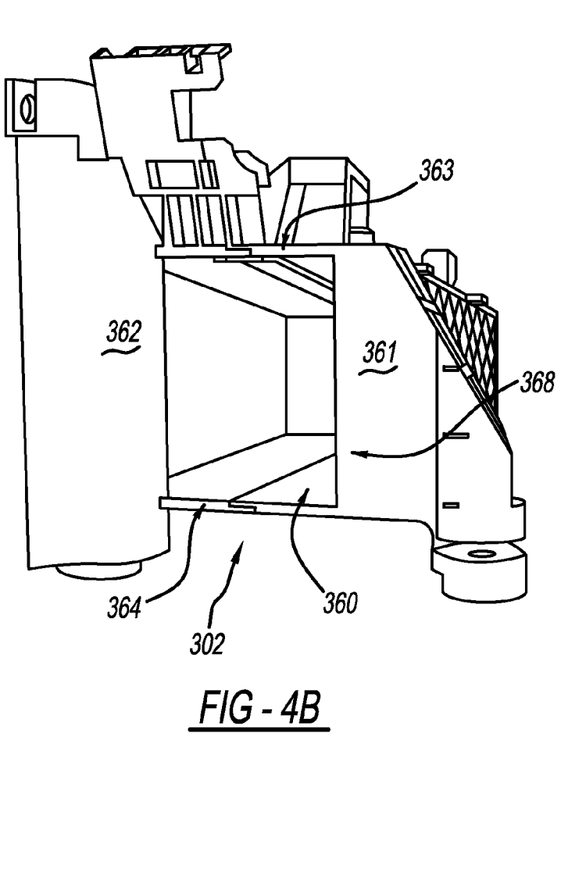
FIG. 4B illustratively depicts a front view of a base of the shifter assembly referenced in FIG. 3.

Referring to FIG. 4A and FIG. 4B, and in one or more embodiments, the base 302 is of an elongated structure along the longitudinal axis "L". Further in view of FIG. 3, the base 302 defines a posterior end 340 and an anterior end 360. The posterior end 340 further defines a posterior area border 348, the anterior end 360 further defines an anterior area border 368, and the bordering areas 348, 368 together define therein a tunnel 50.

In certain embodiments, and as illustratively depicted in FIG. 4A, the posterior and anterior area borders 348, 368 define there-between a first wall 51 of the base 302, a second wall 52 opposing the first wall 51, and a third and a fourth wall 53, 54 connected to the first wall 51 and the second wall 52. The first wall 51 is further defined with a first posterior end 341 of the posterior area border 348 and a first anterior end 361 of the anterior area border 368. The second wall 52 is further defined with a second posterior end 342 of the posterior border 348 and a second anterior end 362 of the anterior area border 368. The third wall 53 is further defined with a third posterior end 343 of the posterior area border 348 and a third anterior end 363 of the anterior area border 368. The fourth wall 54 is further defined with a fourth posterior end 344 of the posterior area border 348 and a fourth anterior end 364 of the anterior area border 368.

In certain embodiments and as illustratively depicted in FIG. 4A and FIG. 4B, the first wall 51 and the second wall 52 or the first posterior end 341 and the second posterior end 342 are substantially parallel to each other with an angle there-between of no greater than 45 degrees, 35 degrees, 15 degrees or 5 degrees. In certain embodiments, the first wall 51 and the second wall 52 may each vary its height from its rear end to its forward end along the longitudinal axis "L".

In particular, the first wall 51 and the second wall 52 gradually increase their height from the rear end to its forward end along the longitudinal axis "L". The third wall 53 is not parallel to the fourth wall 54. However, the third posterior end 343 and the fourth posterior end 344 may be substantially parallel to each other with an angle there-between of no greater than 45 degrees, 35 degrees, 15 degrees or 5 degrees.

In certain other embodiments, the third and fourth walls 53, 54 may be substantially parallel to each other with an angle there-between of no greater than 45 degrees, 35 degrees, 15 degrees or 5 degrees.

The first wall 51, the second wall 52, the third wall 53 and the fourth wall 54 together define the tunnel 50.

In yet certain other embodiments, and as mentioned herein elsewhere, more than or fewer than four walls may be used to define the tunnel 50, and the tunnel 50 may also be defined by a cylindrical structure instead of the paneled walls such as the first, second, third and fourth walls 51, 52, 53 and 54. As mentioned herein, the air duct 210 is configured having its one end 212 connected to the air conditioner and the another end 214 extending rearward through the tunnel 50 of the shifter assembly 100 to the rear air outlet 124 positioned on the posterior end of the central console 120. The tunnel 50 may thus be formed by a reconfiguration of the base 302 of the shifter assembly 100 without having to necessarily alter an outer shape or to change overall space consumption of the base 302 relative to its surroundings.

As detailed herein elsewhere, the reconfiguration of the base 302 is accomplished by creating the tunnel 50 there-within to receive at least a portion of the air duct 210 such that the air duct 210 is advantageously positioned in a space previously not made available. Moreover, the tunnel 50 provides relatively enhanced protection over the air duct 210 against unwanted compression or other damages due to space constraints. In the event that the shifter assembly 100 is positioned in a way different from what is depicted in FIG. 1 or FIG. 2, such as when the base 302 of the shifter assembly 100 is positioned between the cup holder 112 and the armrest 114, the tunnel 50 is accordingly relatively centrally positioned along the longitudinal axis "L" and accordingly protection over the air duct 210 may further be enhanced as now the tunnel 50 is positioned even more central relative to the entirety of the air duct 210.

Even though the position of the shifter assembly 100 relative to the cup holder 112 or the armrest 114 is not limited to any particular configuration such as the configuration depicted in FIG. 1 or FIG. 2, the creation of the tunnel 50 within the base 302 of the shifter assembly 100 provides advantageous flexibility by which the air duct 210 may be positioned and protected without unnecessary compromise in space or air transport efficiency.

The tunnel 50 has been described in relation to the figures as being defined by four sides so as to adopt a rectangular shape in general, however, the tunnel 50 may at any portions thereof take any suitable shapes so long as the air duct 210 is desirably accommodated. In certain embodiments, the cross-section of the tunnel 50 may generally be rectangular, and sized to allow for enhanced use of space. However, the cross-section of the tunnel 50 may be of any suitable shapes such as the shape of a circle, a triangle, and a trapezoid. To adopt these alternative shapes, for instance, the anterior area border 368, the posterior area border 348 and the walls 51, 52, 53 and 54 defined there-between may collectively be shaped or configured such that a random cross-section of the base 302 may be a circle, an oval, a triangle, a square, a rectangle or any other suitable shapes.

The first wall 51 may include a number of protrusions to engage the shifter body 304. In certain embodiments, the first wall 51 includes a pair of opposing protrusions 420 proximate to a posterior location thereof, the pair of protrusions 420 each respectively defining thereupon a locking hole 422. The shifter body 304 may be attached to the base 302 via engagement between the locking pole 310 and the locking hole 422. The tunnel 50 as integrated into the base 302 not only provides support for the shifter body 304, but also allows the air duct 210 to pass there through without having to increase the package space of the central console 120, or having to position the air duct 210 toward a side of the base 302 due to space constraints.

Figure 5A:
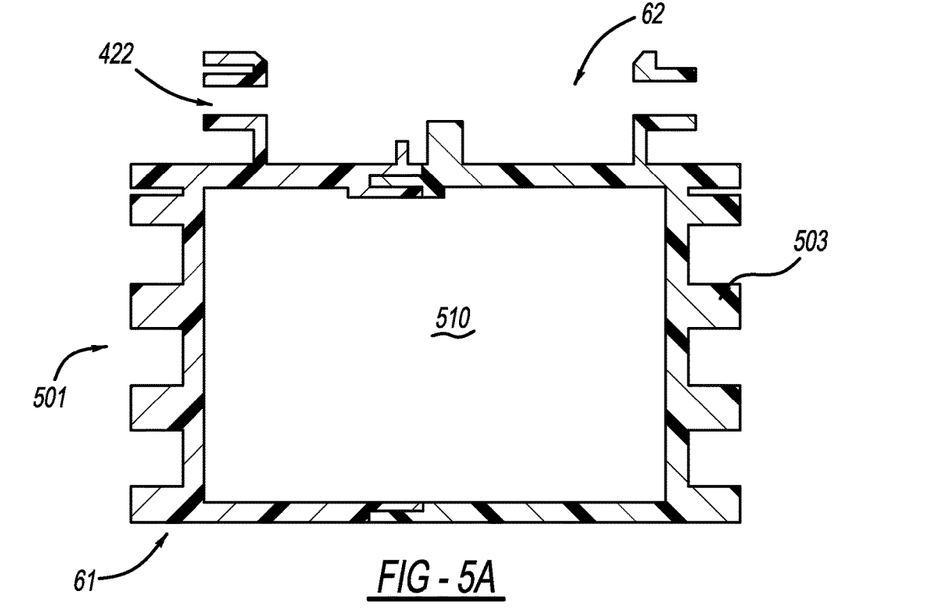
FIG. 5A illustratively depicts a cross-section view the base referenced in FIG. 4A, taken along 5A-5A.
Figure 5B:
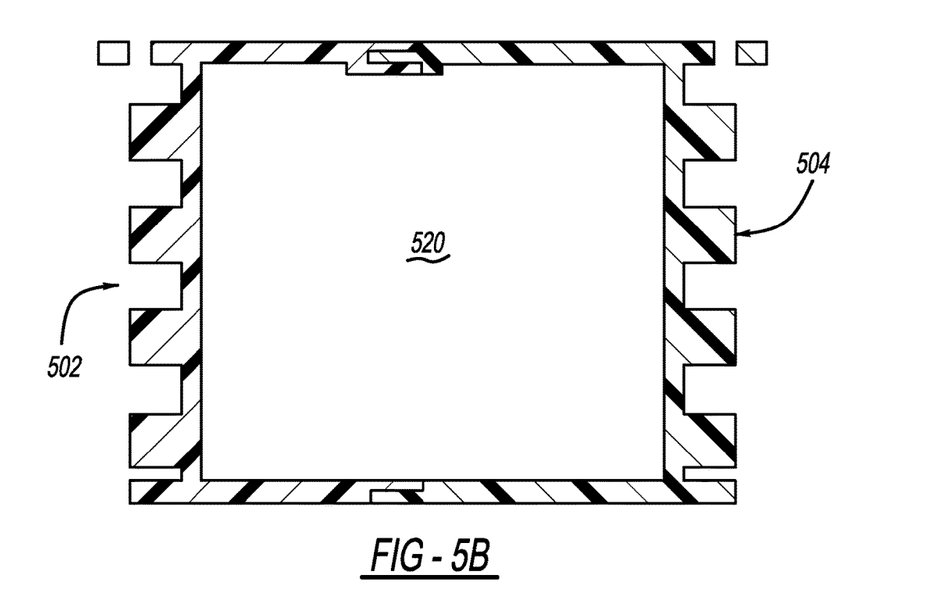
FIG. 5B illustratively depicts a cross-section view of the base referenced in FIG. 4A, taken along 5B-5B.

To further illustrate structures or configurations of portions of the base 302 and particularly the tunnel 50 positioned between the anterior and the posterior ends 360, 340, FIG. 5A and FIG. 5B are respectively a cross-sectional view along line 5A-5A and 5B-5B in FIG. 4A. A first cross-section 501 and a second cross-section 502 illustratively depicted in FIG. 5A and FIG. 5B are spaced apart with distance or space "W" along the longitudinal axis "L". The first cross-section 501 of the base 302 includes a first border 503 defining therein a second aperture 510. The second cross-section 502 of the base 302 includes a second border 504 defining therein a first aperture 520. The first border 503 and the second border 504 are each defined by four sides respectively located on the first wall 51, the second wall 52, the third wall 53 and the fourth wall 54 positioned on the cross-section along 5A-5A and 5B-5B. Two of the four sides located on the third wall 53 and fourth wall 54 are optionally parallel to each other.

In certain embodiments, and as illustratively depicted in FIG. 1, FIG. 2, FIG. 3, FIG. 4A and FIG. 4B, the first aperture 510 and the second aperture 520 are different in area, due to the height of the first wall 51 and the second wall 52 changing in value along the longitudinal axis "L". In certain embodiments, the area of the first aperture 510 is smaller than that of the second aperture 520. In particular, the first aperture 510 and the second aperture 520 may be same in width and different in height.

In one or more embodiments and as mentioned herein elsewhere, the tunnel 50 in its entirety or at any cross-sectional portion thereof may be of any suitable shapes and/or dimensions. Accordingly, the first aperture 510 and the second aperture 520 may be of different shapes, and in particular be different in width and height or be of the same in width and height.

The first border 503 and the second border 504 define there-between walls which are respective portions of the first wall 51, the second wall 52, the third wall 53 and the fourth wall 54. The first aperture 510 and the second aperture 520 define there-between a portion of the tunnel 50 between the first border 503 and the second border 504. The tunnel 50 is enclosed by the walls.

Further, in certain embodiments and as illustratively depicted in FIG. 5A, the base 302 may be constructed by engaging a first portion 61 and a second portion 62 each previously formed separately. The first portion 61 includes the first wall 51, a portion of the third wall 53 and a portion of the fourth wall 54. The second portion 62 includes the second wall 52, the other portion of the third wall 53 and the other portion of the fourth wall 54.

In certain embodiments, in the event that the tunnel 50 has a cross-section in the shape of a rectangle, the first portion 61 and the second portion 62 may each be an inverted U-shaped structure such that the rectangle shape is effected when the first portion 61 and the second portion 62 are connected at locations 410, 412. With the connection, the first portion 61 and the second portion 62 together form the first wall 51, the second wall 52, the third wall 53, the fourth wall 54 and the tunnel 50.

Figure 5C:
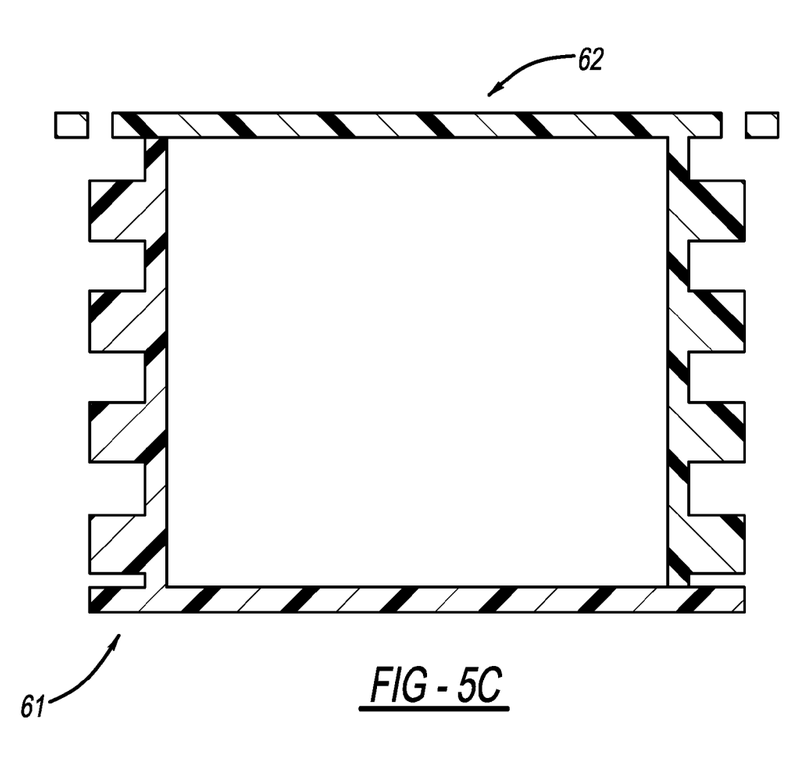
FIG. 5C illustratively depicts another cross-section view of the base referenced in FIG. 4A.

FIG. 5C illustratively depicts a cross-sectional view of the base 302 in according with certain embodiments. The base 302 shown in FIG. 5C may also be constructed by engaging the first portion 61 and the second portion 62 each previously formed separately. The difference is in that the first portion 61 and the second portion 62 may each be an L-shaped structure. In such a configuration, the first portion 61 includes the first wall 51 and the fourth wall 54; and the second portion 62 includes the second wall 52 and the third wall 53. With the connection, the first portion 61 and the second portion 62 together form the first wall 51, the second wall 52, the third wall 53, the fourth wall 54 and the tunnel 50.

In one or more embodiments, the present invention as set forth herein is believed to have overcome certain challenges associated with space constraints particular to the central console. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A base for supporting a shifter, the base comprising:
a longitudinal axis;
a first cross-section including a first border defining therein a first aperture; and
a second cross-section positioned spaced apart from the first cross-section along the longitudinal axis and including a second border defining therein a second aperture,
wherein the first and second borders define a wall positioned there-between, and the first and second apertures define a tunnel positioned there between, the tunnel being at least partially enclosed by the wall.

2. The base of claim 1, wherein at least one of the first border and the second border is defined by four sides.

3. The base of claim 1, wherein two opposing sides of the four sides are positioned with an angle there-between of no greater than 45 degrees.

4. The base of claim 1, wherein the first aperture and the second aperture differ in area.

5. The base of claim 1, wherein the tunnel is provided with dimensions large enough to receive a vehicle air duct.

6. The base of claim 1, wherein at least a portion of the wall includes one or more reinforcing ribs.

7. The base of claim 1, wherein the wall includes first, second, third and fourth walls each extending in a different plane.

8. The base of claim 7, further comprising a protrusion to be attached to a shifter body, the protrusion being positioned on one of the first, second, third and fourth walls.

9. The base of claim 8, wherein the protrusion further includes a locking hole to receive a locking pole via which the base is attached to the shifter body.

10. A shifter assembly, comprising:
a shifter body; and
a base supporting the shifter body and having a longitudinal axis, a first cross-section of the base including a first border defining therein a first aperture, a second cross-section of the base positioned spaced apart from the first cross-section along the longitudinal axis and including a second border defining therein a second aperture, wherein the first and second borders define a wall positioned there-between, and the first and second apertures define a tunnel positioned there between, the tunnel being at least partially enclosed by the wall.

11. The shifter assembly of claim 10, further comprising a locking pole via which the shifter body is attached to the base.

12. The shifter assembly of claim 10, wherein the first aperture and the second aperture differ in area.

13. A vehicle with a longitudinal axis, comprising:
a central console including an armrest and an air outlet positioned below the armrest; and
a shifter assembly positioned anterior to the air outlet of the central console and including a shifter body and a base supporting the shifter body, wherein the base includes a first cross-section including a first border defining therein a first aperture, and a second cross-section positioned spaced apart from the first cross-section along the longitudinal axis and including a second border defining therein a second aperture.

14. The vehicle of claim 13, further comprising an air duct connected to the air outlet of the central console, a portion of the air duct being received through the base of the shifter assembly.

15. The vehicle of claim 14, wherein the base includes a first portion and a second portion to engage the first portion, the first portion and second portions together defining a tunnel to receive at least a portion of the air duct.

16. The vehicle of claim 14, wherein the first aperture and the second aperture differ in area.

17. The vehicle of claim 15, wherein the first portion and second portions together define a first wall of the base, a second wall opposing to the first wall, and a third and fourth wall connecting to the first wall and the second wall respectively.

18. The vehicle of claim 17, wherein the tunnel is defined by the first wall, the second wall, the third wall and the fourth wall.

19. The vehicle of claim 13, further comprising a pair of protrusions positioned on the base to support the shifter body, the pair of protrusions defining a pair of relatively located locking holes by which the shifter body is attached to the base.

* * * * *